April 26, 1960  R. L. DALTON  2,933,996
LOCK FOR FOCUSING MECHANISM OF CAMERA
Filed May 8, 1958

INVENTOR.
ROBERT L. DALTON
BY
ATTORNEY

2,933,996
LOCK FOR FOCUSING MECHANISM OF CAMERA

Robert L. Dalton, Pittsford, N.Y., assignor to Graflex, Inc., Rochester, N.Y., a corporation of Delaware Application May 8, 1958, Serial No. 733,978

4 Claims. (Cl. 95—46)

The present invention relates to photographic cameras, and particularly to photographic cameras of the folding type. In a more specific aspect, the invention relates to a lock for use in securing the objective lens of the camera in focused position.

In the conventional folding camera, the objective lens is carried by a lens board which is connected to the front end of the bellows and which is mounted on a track that is adjustable back and forth on guide rails provided on the folding bed or cover of the camera. Adjustment of the track for focusing is effected by rotation of knobs that are secured to a shaft that is journaled in the bed and that is provided with pinions which mesh with racks which are fastened to the track. For fine focusing, the shaft must turn readily. However, if it is too loose and is turned accidentally the camera will be thrown out of proper focus, and a poor picture will result.

One object of the invention is to provide locking means for a folding camera to lock the shaft, which adjusts the camera track, against rotation, so as thereby to secure the objective lens mount of the camera in focused position.

Another object of the invention is to provide locking means of the character described which can be moved to or from locking position quickly and efficiently, because a photographer cannot afford to lose time fumbling with a lock and lose a picture.

Another object of the invention is to provide a lock of the character described, which is simple in construction, and which can readily be moved to locked or to released position.

Other objects of the invention will be apparent hereinafter from the specification and from the recital of the appended claims.

Figure 1:
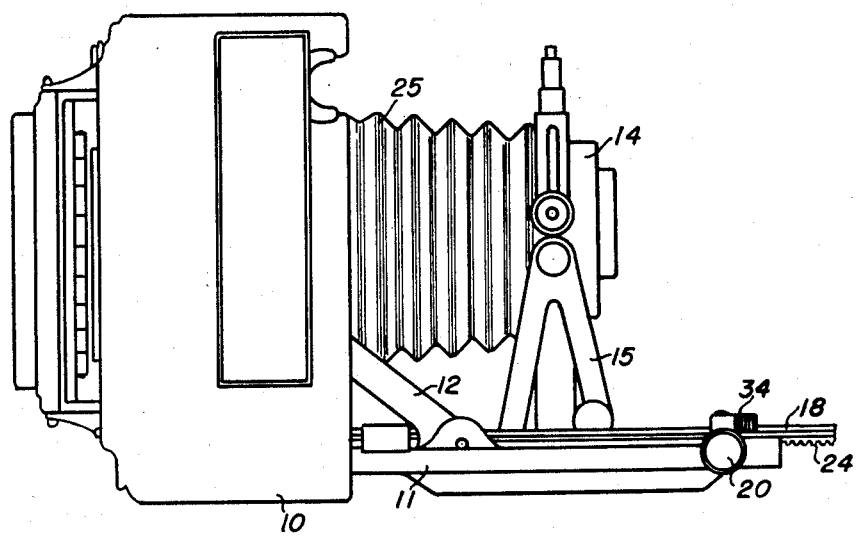
Fig. 1 is a side elevation of a conventional folding camera, showing the front door of the camera opened to form the bed on which the objective lens mount is adjustable back and forth for focusing.

Referring now to the drawing by numerals of reference, 10 denotes the box or case of a conventional folding camera; and 11 denotes the door or bed of this camera. The door or bed is hinged to the camera box or casing 10, and is held in operative position by the side arms 12.

Figure 3:
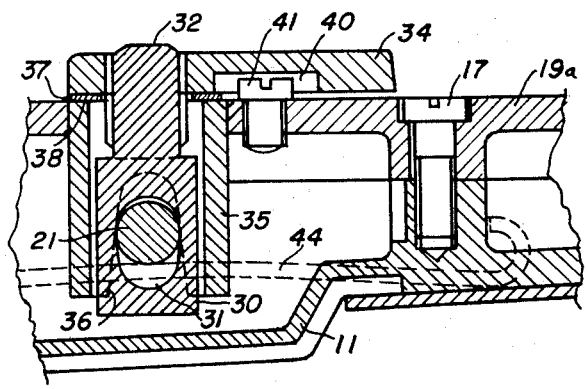
Fig. 3 is a section on the line 3—3 of Fig. 2 on an enlarged scale and looking in the direction of the arrows.
Figure 2:
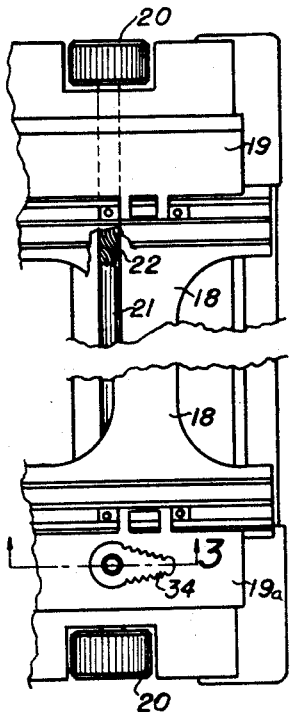
Fig. 2 is a fragmentary plan view on a somewhat enlarged scale of the camera door or bed, parts being broken away to show the means for effecting the focusing adjustment.

The objective or front lens 14 of the camera is mounted in conventional manner by means of brackets 15 to a track 18 which is adapted to be adjusted back and forth in guide rails 19 provided on bed 11. The guide rails 19 are secured to the bed 11 by screws 17 (Fig. 3). Focusing is effected, as usual, by focusing knobs 20. These knobs are secured to a shaft 21 which is journaled in the bed, and which has two axially-spaced pinions 22 integral with that mesh, respectively, with a pair of spaced parallel racks 24 formed on the undersides of the track 18. By rotation of the knobs 20, then, the objective lens mount can be adjusted back and forth for focusing.

The lens board is connected in usual manner by the bellows 25 to the camera box or casing 10.

For precision work it is desirable to lock the lens mount in adjusted focusing position so as to prevent accidental displacement of the same. For this purpose I have provided the locking device of the present invention. This comprises a post 30 which is slidable up and down in the bed of the camera in a direction transverse of shaft 21. This post has an elongate slot 31 extending through it to receive the shaft 21. The post is of reduced diameter adjacent its upper end and projects upwardly through an opening in one of the guide rails 19, here denoted at 19a. It is threaded on the periphery of this reduced diameter portion to thread into a lever 34 which is disposed above this guide rail 19a.

Surrounding the post and slidably mounted for axial movement in the bed 11 and the one guide rail 19a is a sleeve 35. This sleeve has a diametral slot extending through its lower end, as denoted at 36, in alignment with slot 31, to receive the shaft 21. The slot 36 in the sleeve 35 has its side walls converging upwardly; and the slot 31 in the post 30 has its side walls converging slightly downwardly.

When the lever 34 is rotated in a direction to move the post 30 upwardly, its underface 37 presses against a washer 38 which engages the upper surface of the sleeve 35, thereby simultantously forcing the sleeve 35 downwardly. Thus, upon movement of lock lever 34 in one direction the shaft 21 is locked between the two generally V-shaped grooves or recesses 31 and 36 of the post and sleeve, respectively. Only a slight movement of the lever 34 is required to lock the shaft 21, and only a slight movement of the lever 34 in the reverse direction is required to release the shaft. To limit the possible movement of the lever 34, the lever is provided with a recess 40 on its underface in which the head of a stop screw 41 engages. This screw 41 engages one side wall or the other of the recess 40 to limit the swinging movement of the lever 34.

A leaf spring 44 may be provided in the bed 11 to press against the shaft 21 to constantly urge the shaft upwardly so that there is a constant drag on the shaft limiting its rotational movement.

With the locking device of the present invention, then, the photographer pushes the lever 34 in one direction to release the lock and by turning one or both knobs 20 focuses the camera. Then he pushes the lever 34 in the opposite direction to draw up on post 30 and to force sleeve 35 down to lock shaft 21 against rotation thereby locking the objective lens mount in focused position. This requires just a push of the thumb or finger to lock the track 18 in focused position, and just a push of the thumb or finger to release it again. This locking device operates quickly and efficiently. The lever 34 may be knurled on its periphery as shown for easy gripping.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a camera having a bed, a rotatable shaft journaled in said bed for effecting focusing, means for locking said shaft against rotation comprising two members slidably mounted in said bed and movable toward and away from one another, one of said members having a slot therein engageable with said shaft at one side of said shaft, said slot having side walls converging away from the axis of said shaft the other of said members having a slot engageable with the diametrally opposite side of said shaft, the side walls of the latter slot also converging away from the axis of said shaft, means for moving said members toward one another to wedge said shaft between the walls of said slots, and away from one another to release said shaft, and a leaf spring mounted at opposite ends in said bed and engageable intermediate its ends with said shaft to continuously urge said shaft toward the narrow end of the slot in one of said members and to apply a constant drag on the shaft.

2. In a camera having a rotatable shaft for effecting focusing, means for locking said shaft against rotation comprising a post having a slot therethrough through which said shaft passes, a sleeve surrounding said post and having a slot therethrough aligned with the first-named slot and through which said shaft also passes, each of said slots having converging sides, one of said slots having its sides converging in one direction and the sides of the other slot converging in the opposite direction, and means for moving said post and sleeve toward and from one another to move said sides to and from locking engagement with said shaft.

3. In a camera having a rotatable shaft for effecting focusing, means for locking said shaft against rotation comprising a post having a slot therethrough through which said shaft passes, a sleeve surrounding said post and having a slot therethrough aligned with the first-named slot and through which said shaft also passes, each of said slots having its sides converging away from said shaft and means for moving said post and sleeve simultaneously in opposite directions to wedge said shaft between said sides to lock said shaft against rotation.

4. In a camera having a rotatable shaft for effecting focusing, means for locking said shaft against rotation comprising a post having a slot therethrough, which straddles said shaft, a sleeve surrounding said post and having a slot therethrough aligned with the first-named slot and which also straddles said shaft, the slot in said post having its sides converging toward one end of said post, the slot in said sleeve having its sides converging toward the opposite end of said sleeve, said post being threaded at one end, and a lever threadably engaging said one end of said post and positioned to transmit pressure to the adjacent end of said sleeve to move said post and sleeve simultaneously in opposite directions to wedge said shaft between the converging ends of said slots.

References Cited in the file of this patent

UNITED STATES PATENTS

| 1,363,676 | Schwemmer | Dec. 28, 1920 |

FOREIGN PATENTS

| 494,760 | Italy | May 29, 1954 |